Nov. 7, 1933.     R. STICKDORN     1,934,336
CLOSET FLUSHING APPARATUS
Filed Aug. 31, 1931     2 Sheets-Sheet 2

Inventor:
R. Stickdorn
By: Marks & Clerk
Attys.

Patented Nov. 7, 1933

1,934,336

UNITED STATES PATENT OFFICE 1,934,336

CLOSET FLUSHING APPARATUS

Robert Stickdorn, Munich, Germany

Application August 31, 1931, Serial No. 560,439, and in Germany September 23, 1930

10 Claims. (Cl. 4—39)

This invention relates to closet-flushing apparatus with two flushing-water vessels, which fill and empty alternately under the control of a reversing cock.

The main object of the invention is to preclude leakiness of the reversing cock arising from wear and to avoid the troublesome readjustment for restoring water-tight closure.

In view of this object a device acting by liquid pressure is provided in connection with the reversing cock for pressing the frusto-conical cock plug against the sealing surface of the cock casing. The free axial movability of the plug requisite for this purpose is obtained by a suitable loose coupling of the plug to its spindle.

Other objects of the invention will be evident from the following specification.

The drawings illustrate by way of example a constructional form of the invention applied to a flushing apparatus of the air-vessel type.

Fig. 3 shows a detail in section in the same plane as Fig. 1, but on an enlarged scale.

Figure 1:
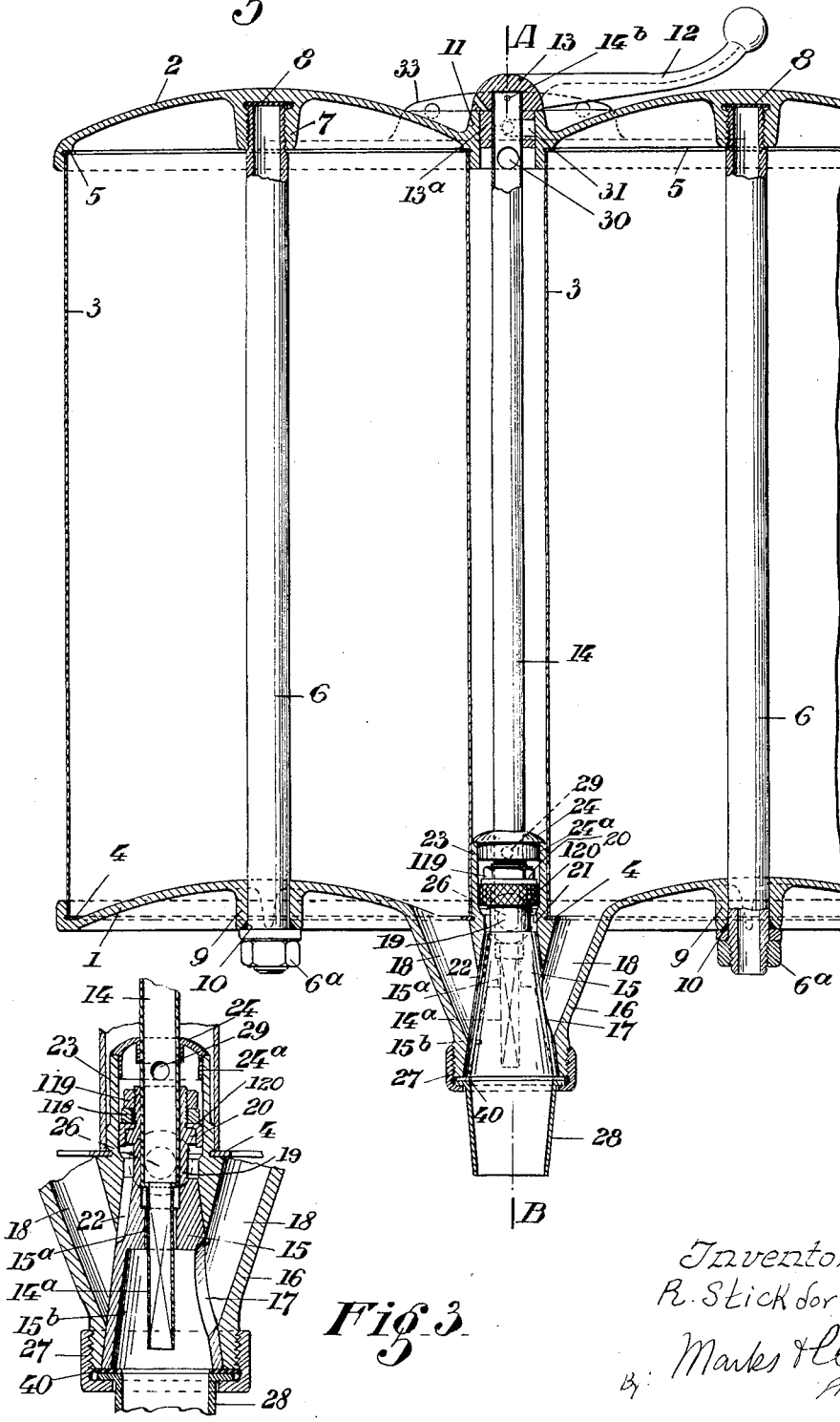
Fig. 1 is a sectional elevation in the comomn central plane of the two symmetrically arranged flushing-water vessels, parts being shown in elevation.
Figure 2:
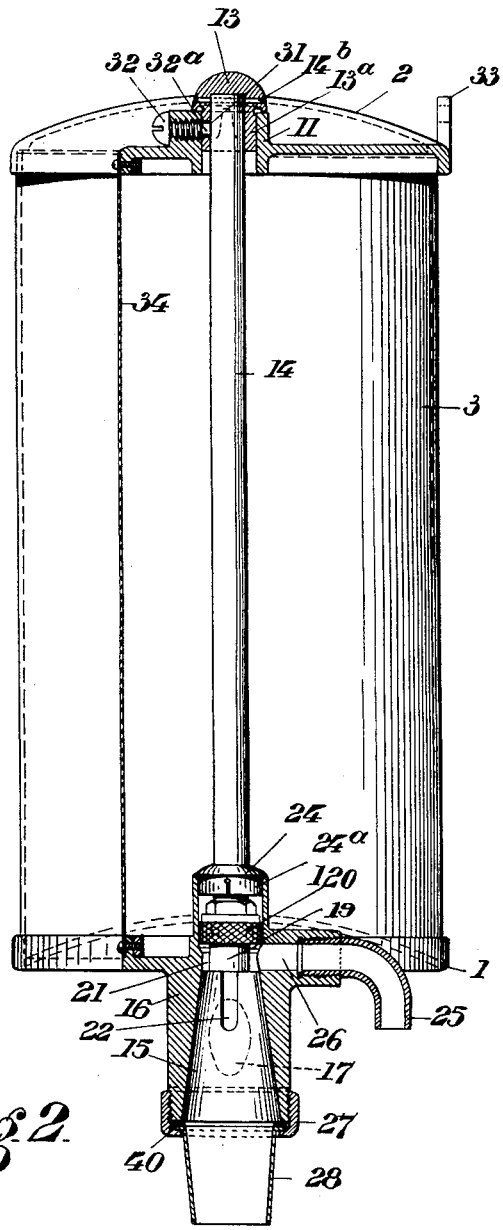
Fig. 2 is a section on the line A—B in Fig. 1, some parts being shown in elevation.

The double flushing-water vessel consists of a bottom piece 1, a head piece 2, and two cylinders 3 clamped between them, with the interposition of packings 4 and 5. For gripping the parts firmly together tubular bolts 6 are provided, which are screwed into threaded inward projections 7 on the head piece 2 and sealed therein by means of discs 8 to prevent the escape of air. The bottom piece 1 is provided, in the region of each vessel with a socket 9, through which the bolt 6 passes to the outside. In a recess turned in the socket is lodged a compressible packing 10, which provides for the necessary sealing at this point when a nut 6a is tightened up.

The head piece 2 has in the centre, between the closure members of the two vessels, a bearing bush 11, in which there engages the head 13 of a hand lever 12 with a cylindrical projection 13a. In the head 13 a tubular spindle 14 is secured by means of a pin 14b. The spindle 14 has at the lower end a square extension 14a of reduced cross section. To this extension there corresponds a square aperture 15a in a frusto-conical plug 15, which is ground into a cock casing 16 in the middle of the bottom piece 1. The plug has a lateral aperture 17, to which there correspond two inclined passages 18 leading to the two water tanks. A plug extension 19 of reduced cross section carries, inside a hollow cylindrical extension 23 of the cock casing, a piston 20, with a cup-leather packing 120 directed towards the plug and held in place by a nut 119 and an interposed ring 118. Between this and the thin end of the plug is located an anular passage 21, from which there starts a flat passage 22, extending in the longitudinal direction of the plug, diametrically opposite to the cock plug aperture 17, in the surface of the plug. The diameter of the piston 20 is greater than that of the thin end of the cock plug, so that the water pressure acting upon the piston keeps the plug constantly pressed in a fluid-tight manner against the internal surface of the casing. The cylinder 23 is closed at the top by a cover 24, which preferably engages in the cylinder by a slotted and therefore resilient margin 24a.

In the region of the annular passage 21 there opens into the cock casing from the rear a passage 26 connected to the water inlet 25. The plug 15 is bored out conically at the downwardly directed wide end, and therefore has the form of an inverted cup. Into the bore 15b the aperture 17 opens. A connecting spigot 28 for the flushing pipe is screwed from below on to the cock casing 16 by means of a screw cap 27, with the interposition of a packing 40. The packing 40 serves at the same time as a stop for the plug 15, in order that in the event of any stoppage of the water pipe, whereby the pressure upon the piston 20 disappears, it cannot sink to any considerable extent. Above the piston 20 the tubular spindle 14, within the cylinder 23, has an aperture 29, through which any water leaking past the piston can escape into the spindle 14 and through the latter into the flushing pipe. A second aperture 30, for ventilating the flushing pipe and promoting the flushing action, and also for reliably preventing back suction of contaminated water into the supply pipe when draining the domestic water pipe and the like, is provided at the upper end of the tubular spindle 14. The aperture 30 is located below the projection 13a of the lever head 13 in a covered position to prevent it from becoming choked by foreign bodies, dust and the like.

From the purpose of limiting the control movement of the cock plug the cylindrical projection 13a on the lever head 13 has a peripheral slot 31 extending over about 180 degrees, in which there engages a locking pin 32a, mounted in the bush 11. By this pin, which is constructed as a projection on a screw 32 turned in from outside, the tubular spindle 14 is at the same time prevented from being pulled out. The tubular spindle 14 engages by its square end 14a loosely in the plug 15, so that an axial movement of the plug relatively to the spindle is possible.

On the rear side there is fitted to the head piece 2 an attachment 32, provided with screw holes, for securing the flushing apparatus to the wall or the like.

The space between the two vessels 3 is closed in the front by a cover plate 34, which makes the hollow spindle 14 and the upper portion of the cock casing inaccessible.

In the position illustrated, the right-hand flushing vessel is connected, through the right-hand passage 18, the aperture 17 and the connecting spigot 28, with the flushing pipe, and the left-hand flushing vessel is connected by the annular passage 21, the longitudinal passage 22 and the left-hand passage 18 with the supply passage 26, so that flushing takes place from the right-hand vessel, and the left-hand vessel is filling. If the lever 12 is rotated through 180 degrees, the allocation of the two vessels to the supply passage and the flushing pipe is reversed. In an intermediate position both passages are shut off, so that in no position of the cock plug is there a direct connection between the water-supply pipe and the closet pan.

When a vessel is filling, the air contained therein is compressed by the entering water so that after reversing the cock flushing will take place under the pressure of the compressed air as well known in the art.

By the special arrangement and design of the plug in the form of an inverted cup, and the oblique arrangement of the lateral supply passages 18, a special kind of flushing effect is obtained. When the plug is rotated there is at first, owing to the cooperation of the passage 18 and the plug aperture 17, a one-sided flow aperture, through which the water penetrates more or less tangentially into the plug cavity. Owing to this, and owing to the inclination of the passage at an obtuse angle to the direction of discharge, there is produced in the plug cavity a spiral vortex movement, which, when once initiated, continues even when the plug is so rotated as to open the passage fully. This vortex motion has the result that the water, when discharged into the closet pan, spreads out like a veil or film, so that a large area of the pan is scrubbed by the flow of water.

By specially designing the flushing pipe, or the spigot 28 merging into it, the vortex motion can be suitably modified, strengthened or weakened for instance. A strengthening of the vortex motion is obtained by conically tapering the spigot 28.

I claim:

1. Closet-flushing apparatus, comprising two flushing-water vessels, means for connecting the apparatus to a water supply, a discharge nozzle, a reversing cock, consisting of an internally frusto-conical cock casing and a frusto-conical cock plug, adapted to place each of the two vessels in communication with the water supply and the discharge nozzle alternately, a sealing surface on the cock casing, and means acting by liquid pressure for permanently tightly pressing the cock plug against the entire sealing surface of said cock casing in axial direction.

2. Closet-flushing apparatus, comprising two flushing-water vessels, means for connecting the apparatus to a water supply, a discharge branch adapted to be connected to a flushing pipe, and a reversing cock adapted to place each of the two vessels in communication with the water supply and the discharge branch alternately, the said reversing cock comprising a frusto-conical cock plug with its smaller end upwards, an internally frusto-conical cock casing, and a cylindrical piston, of a diameter greater than that of the small end of the cock plug, secured to the cock plug above the said small end, the cock plug being formed with an annular passage at its small upper end, below the cylindrical piston, communicating with the water supply.

3. Closet-flushing apparatus as claimed in claim 2, further comprising an internally cylindrical upward extension of the cock casing, said extension having an internal diameter larger than the diameter of the smaller end of the plug and receiving said piston.

4. Closet-flushing apparatus as claimed in claim 1, further comprising an actuating spindle for the cock plug, the said spindle being of prismatic cross section at its lower end, and the cock plug being formed with a corresponding prismatic hole therethrough, adapted to engage slidably but non-rotatably with the lower end of the spindle.

5. Closet-flushing apparatus, comprising two flushing-water vessels, means for connecting the apparatus to a water supply, a discharge branch adapted to be connected to a flushing pipe, a reversing cock, consisting of a cock casing and a cock plug, adapted to place each of the two vessels in communication with the water supply and the discharge branch alternately, and a tubular plug spindle communicating with the interior of the cock casing and adapted to ventilate the flushing pipe connected to the discharge branch, and to discharge leakage water.

6. Closet-flushing apparatus as claimed in claim 1, in which the two vessels are arranged side by side and parallel to one another with a space between them, the cock being arranged with its axis parallel to the vessels, said cock plug having a spindle thereon disposed in the space.

7. Closet-flushing apparatus as claimed in claim 1, in which the side walls of the vessels are substantially cylindrical in shape, the cock casing and the bottoms of the two vessels being integral with one another, the tops of the two vessels being integral with one another, and the apparatus further comprising a spindle for actuating the cock plug, a guide for the upper end of this spindle, the said guide being integral with the tops of the vessels, and means for clamping the cylindrical walls of the vessels between the bottoms and tops thereof.

8. Closet-flushing apparatus as claimed in claim 1, the side walls of the vessels being substantially cylindrical in shape, the cock casing and the bottoms of the two vessels being integral with one another, the tops of the two vessels being also integral with one another, and the apparatus further comprising a spindle for actuating the cock plug, a guide for the upper end of this spindle, means for clamping the cylindrical walls of the vessels between the bottoms and tops thereof, and a front cover plate closing the space between the two cylinders and rendering the spindle inaccessible.

9. Closet-flushing apparatus, comprising two flushing water vessels, means for connecting the apparatus to a water supply, a discharge branch having a conically tapering passage adapted to be connected to a flushing pipe, a reversing cock consisting of a cock casing and a conically flared cock plug having a conically flaring axial discharge passage connected to the tapering passage of the discharge branch, and passages leading from the vessels to the reversing cock, the axes of the last named passages being inclined at obtuse angles to the axis of said discharge passage, and the reversing cock being adapted to place the said passages in communication with the discharge branch through said discharge passage and with the water supply alternately.

10. Closet-flushing apparatus, comprising two flushing-water vessels, means for connecting the apparatus to a water supply, a discharge branch adapted to be connected to a flushing pipe, a reversing cock, consisting of a cock casing having a frusto-conical bore and of a frusto-conical cock plug having an axially extending frusto-conical passage with the discharge opening at the large end, and passages connecting the vessels with the reversing cock, the axes of the said connecting passages being inclined at obtuse angles to the axis of said frusto-conical plug passage, the reversing cock being adapted to place the said connecting passages in communication with the discharge branch through said plug passage and with the water supply alternately.

ROBERT STICKDORN.